Dec. 17, 1963  W. TRAUTNER ETAL  3,114,508

SHOCK RESISTING LAMP MOUNTING

Filed Oct. 5, 1961

INVENTORS:
WAGN TRAUTNER &
BY DON R. ARMACOST
Fishburn and Gold
ATTORNEYS

United States Patent Office 3,114,508
Patented Dec. 17, 1963

3,114,508
SHOCK RESISTING LAMP MOUNTING
Wagn Trautner, Overland Park, and Don R. Armacost, Mission Hills, Kans., assignors to Peterson Manufacturing Company, Kansas City, Mo., a corporation of Missouri
Filed Oct. 5, 1961, Ser. No. 143,110
9 Claims. (Cl. 240—7.1)

This invention relates to lamp mounting devices, and especially devices for mounting electric lamps on vehicles and the like, and more particularly to shock resisting bulb mountings therefor.

In the operation of vehicles, higher speeds made increased light desirable, and it is now common to use electrical power source of higher voltage than the 6 volts that formerly was used. Lamp bulbs for the higher voltages have more fragile filaments and are more vulnerable to shocks and vibrations. Attempts have been made to isolate lamp bulbs from vibrational and shock stresses to which a vehicle or the like is subjected in operation, but it has been a difficult problem to mount a lamp with such isolation and obtain a simple, inexpensive yet rugged structure. Attempts to provide satisfactory shock mounts have included the use of rubber or like cushioning members between the vehicle and lamp casing and other arrangements of cushioning members, but such attempts have been generally unsatisfactory due to the limitations of shock absorption characteristics of the cushioning member or excessive movement of the bulb, all resulting in frequent filament failures. Such filament failures result in expense in replacement, but also they can create a hazard on the highway if unnoticed by the operator due to improper lighting or signal failures.

The principal objects of the present invention are to provide a shock resistant lamp mount that will support a bulb in proper optic location of its filament with a yieldable support for the holder to substantially eliminate filament failures from operational shock and vibrations; to provide a bulb mounting wherein a metal bulb holder is substantially completely embedded in a flexible or absorbent medium that is suspended or supported on spaced points, all of which are separated from the metal holder by flexible yieldable sections, each of which may be flexed or distorted independently without transmitting any strain or stress to the bulb holder or the other two supporting portions; to provide such a structure wherein a metal socket is in fixed position to maintain bulb filaments properly located for desired light distribution therefrom; to provide such a mounting with a resilient body having resilient portions extending into the bulb socket to bias the conductor terminals into engagement with bulb terminals; to provide such a mounting wherein portions of said body resiliently engage a lamp base at the opening of the bulb socket for resilient embracing thereof; to provide such a mounting with yieldable portions extending outwardly from adjacent the bottom portion of the socket and adapted to engage in an opening in a support to form one of the resilient mounting points; to provide such a mounting wherein said extending portions have passages therethrough for wire leads with restrictions at the outer portions of said passages whereby the wires are tightly and firmly sealed against entrance of foreign matter; to provide such a mounting wherein a ground connection extends between the metal socket and the body member and is held in electrical contact with the socket by resiliency of said body member; and to provide a shock resistant lamp mounting having few parts, that is relatively inexpensive, simple yet sturdy and rugged and efficient in operation in protecting bulbs from failure due to shock and vibration.

Other objects and advantages of this invention will become apparent from the following description taken in connection with the accompanying drawings wherein are set forth by way of illustration and example certain embodiments of this invention.

Figure 1:
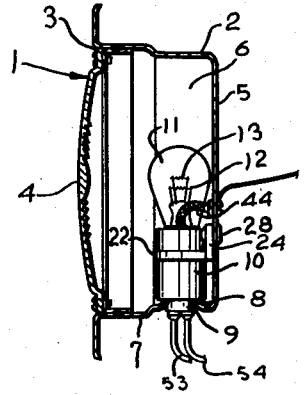
FIG. 1 is a sectional view through a vehicle light with a bulb mounting embodying the features of the present invention.

Referring more in detail to the drawings:

The reference numeral 1 generally designates a vehicle light having a casing 2 provided with an open end 3 closed by a lens 4 secured thereto. The casing has a substantially flat wall 5 spaced from the lens to form a compartment 6 therein and a side wall 7 extending from the wall 5 toward the open end 3 and having an opening 8 through which a portion 9 of a mounting member 10 extends, said mounting member supporting a bulb 11 with filaments 12 and 13 positioned for proper optic location for distribution of light through the lens 4.

The bulb mounting member 10 includes a body 14 having the portion 9 and flanges or supporting portions 15 and 16 extending therefrom, and preferably constituting an integral structure formed of material that is resilient and yieldable, such as rubber or flexible synthetic resins such as polyethylene or polyvinylchloride and the like, such material being capable of deforming under stress and capable of automatic restoration to original form. The body member 14 is preferably generally cylindrical with a wall 17 surrounding a cavity 18 in the body and opening from an end 19. The other end of the body is closed by an end wall 20 which forms a bottom 21 of the cavity 18. In the structure illustrated, the body member has a radially outwardly extending rib 22 intermediate its length and preferably slightly closer to the end 19 than to the end wall 20. The rib 22 extends circumferentially around a portion of the body member and merges into an outwardly extending flange-like portion 23 which terminates in an upwardly extending wall 24 connected to the body member as at 25 and forming the flanges or supporting members 15 and 16 having a rear face 26 adapted to engage the wall 5 or suitable supporting member of the casing. The flanges 15 and 16 each have apertures 27 extending therethrough for receiving fastening devices 28 for securing the flange portions to the wall or support of a casing or the like with the points of support laterally spaced relative to the body member.

Figure 2:
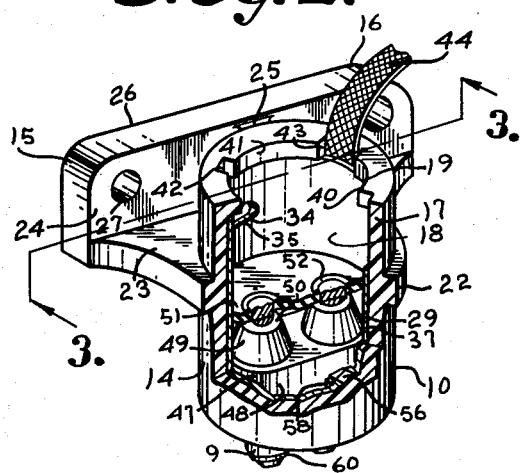
FIG. 2 is an enlarged perspective view of a bulb socket mounting with portions broken away to illustrate the structure thereof.
Figure 3:
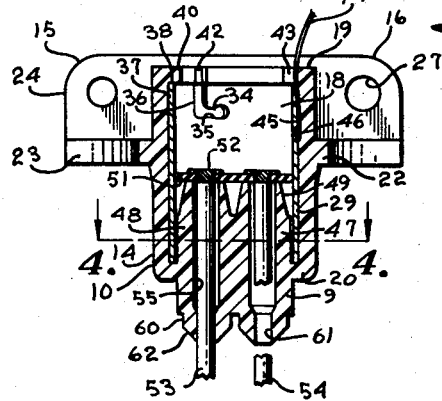
FIG. 3 is a vertical sectional view through the socket mounting substantially on the line 3—3, FIG. 2.
Figure 5:
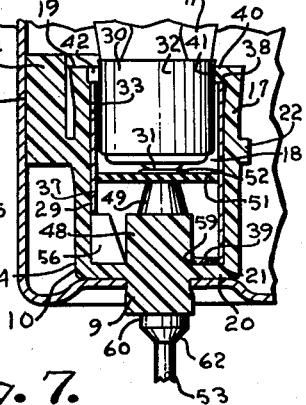
FIG. 5 is an enlarged detail partial sectional view through the lamp housing and bulb mounting.

A metal bulb holder or socket member 29 is positioned in the cavity 18 and is adapted to receive the base 30 of a bulb 11. In the illustrated structure, the bulb 11 is of a standard two-filament type having two contacts 31 spaced apart on the lower end of said base and insulated from a peripheral metal sleeve or portion 32 that forms the ground contact for the bulb. The bulb base also has generally oppositely extending lugs 33 adapted to engage in bayonet slots 34 in the holder, said bayonet slots each having a laterally extending recess 35 at the terminal end of an entrance slot 36. In two-filament type bulbs, such as illustrated, the lugs 33 are of different linear spacing from the contacts 31 and the recesses 35 of the bayonet slots have such a corresponding spacing that the bulb 11 may be positioned only in a predetermined arrangement for location of the filaments. The bulb holder 29 has a cylindrical wall 37 defining an open end 38 with an end wall 39 at the other end, with the cylindrical wall of such length that the end wall 39 engages the end wall 20 of the body member when positioned in the cavity 18, and the open end 38 of the cylindrical wall is spaced from the upper surface or end 19 of the body member. The upper end of the body member has a radially inwardly extending flange 40 engaging over the open end 38 of said holder to retain the holder 29 between the flange 40 and the end wall 20, as illustrated in FIGS. 2 and 3. The flange 40 extends inwardly beyond the wall 37 of the holder and defines an opening 41 of smaller size than the bulb base receiving bore of the holder and slightly smaller than the diameter of said base 30 whereby when a bulb base is positioned in the socket it is resiliently engaged by the flange 40 due to the resilient expansion of the flange and upper portion of the body member by said bulb base, as illustrated in FIG. 5. The flange 40 has slots 42 extending therethrough longitudinally of the body member, said slots 42 registering with the respective entrance slots 36 of the bayonet slots 34 in the holder. The flange 40 also preferably has a slot 43 extending therethrough to receive a conductor in the form of a metal band or the like 44 whereby an end 45 of said ground conductor extends between the wall 37 of the bulb holder 29 and the body member wall 17 and is resiliently held in contact with the holder as at 46. If desired, the end 45 of the ground conductor may be suitably secured as by soldering to the external surface of the cylindrical wall 37 of the holder whereby said ground conductor extends upwardly through the slot 43 and is adapted to be connected to a suitable ground in the electric circuit for the bulb.

Figure 4:
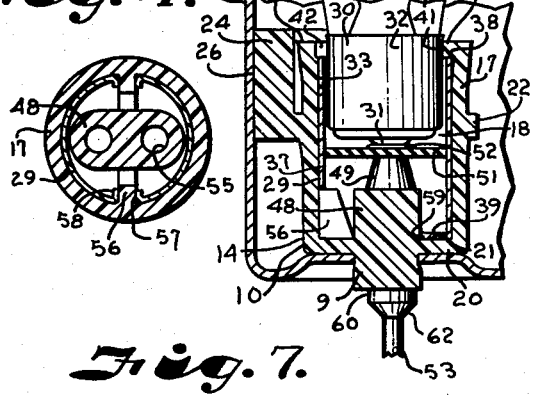
FIG. 4 is a transverse sectional view through the socket mounting on the line 4—4, FIG. 3.

In the illustrated structure, the body member 14 has integral projections 47 extending upwardly in the cavity 18 from the end wall 20, with the lower portions 48 of said projections forming an elongate preferably oval cross section as illustrated in FIG. 4. The projections 47 have spaced upwardly extending tapered portions 49 for increased flexibility and terminate in ends 50 adapted to engage a non-conducting terminal plate 51 in the holder and movable longitudinally or axially thereof. The terminal plate has spaced terminal contacts 52 adapted to engage the contacts 31 of the bulb 11 positioned in the holder. The terminal contacts are electrically connected by conductors or wires 53 and 54 which extend through bores 55 arranged axially of the portions 49, said bores 55 in the upper portions providing reduced wall thickness therein whereby said portions 49 have resiliency which tends to bias the terminal plate 51 and the terminal contacts 52 thereon upwardly toward a bulb positioned in the holder. One or more locating ribs 56 are arranged in the cavity 18 adjacent the bottom thereof, said ribs preferably being of substantially the same height as the lower projection portion 48 and inclined downwardly and inwardly from the body wall toward said portion 48 at the sides thereof, as illustrated in FIG. 4.

The holder 29 has slots 57 formed by inwardly turned spaced portions 58 at the lower portion of the cylindrical wall to engage over the ribs 56 and form locating members for accurately positioning the bulb holder and the bayonet slots relative to the mounting flanges whereby when installed in a light the filaments of the bulb will be in proper location. The bottom or end wall 39 of the bulb holder 29 has an elongate opening 59 adapted to receive the portion 48 to further aid in positively locating the holder relative to the body member, with engagement of the lower portion of the holder 29 with the ribs 56, the projection portion 48 and the bottom wall 20 cooperating with the engagement at the open end by the flange 40, providing a complete embracing of the metal bulb holder 29 whereby it is, in effect, embedded in the body member.

The portion 9 of the body member extends outwardly from the end wall 20 substantially in alignment with the projection 47 in the cavity 18, and the bores 55 for the conductors 53 and 54 extend therethrough. Spaced end projections or bosses 60 are arranged on the portion 9 and have reduced bores 61 coaxial with the respective bores 55, the bores 61 being smaller or restricted to a size smaller than the conductors 53 and 54 and the terminal ends of the bosses 60 being tapered or generally conical as at 62 to provide reduced cross section whereby the conductors 53 and 54 extending through the restricted bores 61 are tightly held and sealed against entry of foreign matter, dust, water and the like into the holder. The resilient gripping of the wires also tends to hold the wires in place relative to the body member and reduce or eliminate any vibration that might be transmitted therethrough to the bulb.

The normal positioning of the terminal plate 51, due to the positioning of the end 50 of the portions 49 when in extended position, is such that the spacing from the contacts 52 to the recesses 35 of the bayonet slots is substantially less than the spacing between the contacts 31 and the lugs 33 on the bulb base whereby when a bulb is mounted in the holder with the base in the socket and the lugs 33 engaged in the recesses 35, contacts 31 engage the contacts 52 and the portions 49 are compressed, always maintaining a resilient pressure on the contact end of the bulb base, maintaining the lugs 33 in the recesses 35 of the bayonet slots and cooperating with the engagement of the flange 40 with the upper portion of the bulb base to resiliently support the bulb in the socket and body member.

In assembling a structure constructed as described, the body member being molded in one piece with the flanges 15 and 16 and the projections 9 and 48 integral therewith the metal bulb holder or socket 29 shaped as described, the lower end of the metal holder is inserted in the opening 41 expanding same due to the resiliency of the material of the body member, and with the slots 57 registering with the ribs 56 and the opening 59 registering with the periphery of the projection 48, said holder is pushed inwardly into the cavity 18 until the wall 39 engages the bottom wall 20 of the body member. The wires 53 and 54 are extended through the bores 61 and 55 and the conductor portions connected to the contacts 52 on the plate 51, and said wires 53 and 54 are then retracted until the contact plate engages the upper end 50 of the projection portions 49. The ground terminal band 44 is inserted through the slot 43 between the wall 37 and the body, as illustrated in FIG. 3, to make a ground connection to the metal holder. In mounting the structure in a casing of a light, such as illustrated in FIG. 1, the outward projection or portion 9 is inserted through an opening 8 in the casing wall and is tightly engaged therein to substantially form a resilient seal to prevent dirt and the like entering the casing, as well as forming a mounting point for the structure, and then the surfaces 26 of the flanges 15 and 16 are engaged with the support wall 5 and secured thereto by suitable fastening devices such as rivets, bolts or the like 28, forming spaced apart connecting points. The arrangement of the fastening of the flanges 15 and 16 and the projection 9 engaging in the opening 8 in the casing provides a three-point mounting or suspension with each of said points removed or separated from the metal bulb holder by flexible yieldable sections, each of which may be flexed or distorted independently without transmitting material strain or stress to the other supporting points or the bulb holder. Also, all vibration or shock stresses and strain from a vehicle or the like to the bulb must be transmitted through the three points of mounting of the body member and the yieldability and resiliency of the material thereof between said mounting points and the metal holder substantially isolates said metal holder from such vibrations, stresses and strain, yet provide a support that holds the bulb and its filaments in proper location for light distribution.

Figure 6:
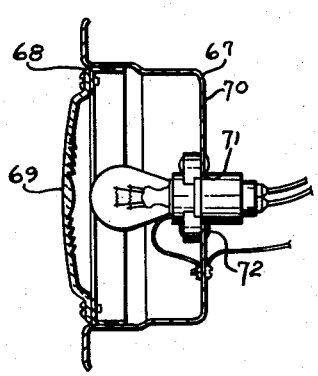
FIG. 6 is a sectional view through a vehicle light with a modified form of bulb mounting therein.
Figure 7:
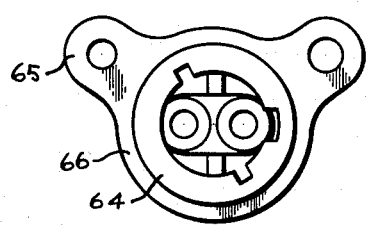
FIG. 7 is an elevational view of the modified bulb mounting member looking toward the socket opening thereof.

In the form of the invention illustrated in FIGS. 6 and 7, the body member 64 contains a metal holder and has projections in the cavity and externally of the body member corresponding to the projections 48 and 9 on the form of structure illustrated and described in FIGS. 1 to 5 inclusive, whereby the modified structure substantially corresponds to the structure illustrated in FIGS. 1 to 5 inclusive except for the arrangement of the mounting flanges, the body member 64 having flanges or ears 65 extending substantially radially and merging with the rib 66 that extends circumferentially of the body member whereby the structure will support a bulb 11 in a casing 67 of a light 68 whereby the bulb axis is parallel with the axis of the light and lens 69 thereof, as illustrated in FIG. 6. In this structure, the rear wall or support plate 70 has an opening 71 of a size to receive the end portion of the body member below the rib 66 whereby said body member extends through said wall opening and is resiliently engaged with said wall, and the ears 65 engage said wall and are secured thereto by suitable fastening devices such as rivets 72. The assembly of the metal bulb holder in the body member, the arrangement of the contact plate and wires, and function of the respective portions in said modified form are substantially the same as the form illustrated and described relative to the FIGURES 1 to 5 inclusive, except for the orientation of the bulb in the light fixture.

It is to be understood that while we have illustrated and described certain forms of our invention, it is not to be limited to the specific forms or arrangements of parts herein described and shown except insofar as such limitations are included in the claims.

What we claim and desire to secure by Letters Patent is:

1. In a lamp bulb mounting device, a shock resistant body member of non-conducting resilient vibration dampening material having a recess extending axially therein from an open end and terminating in a bottom, a flange on said body and extending radially inwardly in the recess in spaced relation to the bottom thereof, a bulb socket disposed in said recess between and engaged with said bottom and flange, said bulb socket receiving a bulb base therein and said flange extending radially inwardly of said bulb socket to resiliently engage the bulb base, means integral with said body and engaging said bulb socket to retain same against relative rotative movement, a terminal plate in said bulb socket and movable longitudinally thereof, means biasing said terminal plate toward the open end of the recess, a rigid support for said body member, said rigid support having an opening therein, a resilient portion of said body extending through said support opening in resilient engagement therewith, and flexible supporting flanges integral with said body and extending outwardly therefrom and having surfaces engaging the support in spaced relation to said support opening, said supporting flange being secured to said support to cooperate with the resilient portion of the body in resiliently supporting said body relative to the support.

2. In a lamp bulb mounting device, a shock resistant body member of non-conducting resilient vibration dampening material having a recess extending axially therein from an open end and terminating in a bottom, a flange on said body and extending radially inwardly in the recess in spaced relation to the bottom thereof, a bulb socket disposed in said recess between and engaged with said bottom and flange, said bulb socket receiving a bulb base therein and said flange extending radially inwardly of said socket and resiliently engaging said bulb base, said bulb socket having an opening adjacent the recess bottom, a terminal plate in said bulb socket and movable longitudinally thereof, resilient projections integral with said body and extending from the recess bottom through the opening in the socket, said projections biasing said terminal plate toward the open end of the recess for engagement by a bulb base positioned in said socket, a rigid support for said body member, and flexible supporting flanges integral with said body and extending outwardly therefrom and having surfaces engaging the support, said supporting flanges being secured to said support to resiliently support said body relative to the support.

3. In a lamp bulb mounting device, a shock resistant body member of non-conducting resilient vibration dampening material having a recess extending axially therein form an open end and terminating in a bottom, a flange on said body and extending radially inwardly in the recess in spaced relation to the bottom thereof, a bulb socket disposed in said recess between and engaged with said bottom and flange, said bulb socket receiving a bulb base therein and said flange extending radially inwardly of said socket and resiliently gripping said bulb base, said bulb socket having an opening adjacent the recess bottom, a terminal plate in said bulb socket and movable longitudinally thereof, resilient projections integral with said body and extending from the recess bottom through the opening in the socket, said projections biasing said terminal plate toward the open end of the recess for engagement by a bulb base positioned in said socket, said projections having passages therein for conductors to the terminal plate, a rigid support for said body member, said rigid support having portion defining an opening therein, a resilient portion of said body extending through said support opening and resiliently engaging the support portions defining same, and flexible supporting flanges integral with said body and extending outwardly therefrom and having surfaces engaging the support in spaced relation to said support opening, said supporting flanges being secured to said support to cooperate with the resilient portion of the body in resiliently supporting said body relative to the support.

4. In a lamp bulb mounting device, a shock resistant body member of non-conducting resilient vibration dampening material having a recess extending axially therein from an open end and terminating in a bottom, a flange on said body and extending radially inwardly in the recess in spaced relation to the bottom thereof, a bulb socket disposed in said recess between and engaged with said bottom and flange, said bulb socket receiving a bulb base therein and said flange extending radially inwardly of said socket and resiliently gripping said bulb base, means integral with said body and in said recess engaging said bulb socket to retain same against relative rotative movement, a grounding strap extending into said recess between the body and socket and in electrical contact with said socket, said bulb socket having an opening adjacent the recess bottom, a terminal plate in said bulb socket and movable longitudinally thereof, resilient projections integral with said body and extending from the recess bottom through the opening in the socket, said projections biasing said terminal plate toward the open end of the recess for engagement by a bulb base positioned in said socket, said projections having passages therein for conductors to the terminal plate, a rigid support for said body member, said rigid support having portions defining an opening therein, a resilient portion of said body extending through said support opening and resiliently engaging said portions defining said opening, and flexible supporting flanges integral with said body and extending outwardly therefrom and having surfaces engaging the support in spaced relation to said support opening, said supporting flanges being secured to said support to cooperate with the resilient portion of the body in resiliently supporting said body relative to the support.

5. In a lamp assembly, a casing having an open end, a lens mounted on said casing and closing the open end thereof, said casing having a flat surface therein spaced from the lens, a metallic bulb socket having an end wall in a plane perpendicular to the longitudinal axis of the socket, said end wall having an elongate opening therein, a shock resistant bulb socket mounting member of non-conducting resilient vibration dampening material, said mounting member comprising a body having a recess extending axially therein from an open end and terminating in a bottom, a flange on said body and extending radially inwardly in the recess in spaced relation to the bottom thereof, said bulb socket being positioned in said recess between and engaged with said bottom and flange, said flange defining a bulb base receiving opening of a size that said flange resiliently grips a bulb base positioned therein, a terminal plate in said bulb socket and movable longitudinally thereof, resilient projections integral with said body and extending from the recessed bottom through the elongate opening in the socket end wall and cooperating therewith to position said socket, said projections biasing said terminal plate toward the open end of the recess for engagement by a bulb positioned in said socket, and flexible supporting flanges integral with said body and extending outwardly therefrom and having a surface engaging the flat surface of the casing and adapted to be secured thereto to resiliently support said body relative to the casing.

6. In a lamp assembly, a casing having an open end, a lens mounted on said casing and closing the open end thereof, said casing having a flat surface therein spaced from the lens, a metallic bulb socket having an end wall in a plane perpendicular to the longitudinal axis of the socket, said end wall having an elongate opening therein, a shock resistant bulb socket mounting member of non-conducting resilient vibration dampening material, said mounting member comprising a body having a recess extending axially therein from an open end and terminating in a bottom, a flange on said body and extending radially inwardly in the recess in spaced relation to the bottom thereof, said bulb socket being positioned in said recess between and engaged with said bottom and flange, said flange defining a bulb base receiving opening of a size that said flange resiliently grips a bulb base positioned therein, a terminal plate in said bulb socket and movable longitudinally thereof, resilient projections integral with said body and extending from the recess bottom through the opening in the socket, said projections biasing said terminal plate toward the open end of the recess for engagement by a bulb positioned in said socket, second projections on said body and extending outwardly therefrom in alignment with the first-named projections, said aligned projections having passages therein for conductors to the terminal plate, said casing having an opening therein spaced from said flat surface, said outwardly extending projections on the body extending through and engaged in said casing opening to define a mounting point of the body, and flexible supporting flanges integral with said body and extending laterally therefrom adjacent the open end of the recess and secured relative to the casing to form spaced mounting points of the body to resiliently support said body relative to the casing.

7. In a lamp assembly, casing having an open end, a lens mounted on said casing and closing the open end thereof, said casing having a flat surface therein spaced from the lens, a metallic bulb socket having an end wall in a plane perpendicular to the longitudinal axis of the socket, said end wall having an elongate opening therein, a shock resistant bulb socket mounting member of non-conducting resilent vibration dampening material, said mounting member comprising a body having a recess extending axially therein from an open end and terminating in a bottom, a flange on said body and extending radially inwardly in the recess in spaced relation to the bottom thereof, said bulb socket being positioned in said recess between and engaged with said bottom and flange, said flange defining a bulb base receiving opening of a size that said flange resiliently grips a bulb base positioned therein, a terminal plate in said bulb socket and movable longitudinally thereof, means biasing said terminal plate toward the open end of the recess, projections on said body and extending outwardly therefrom longitudinally of said body, said projections having passages therein for conductors to the terminal plate, portions of the outwardly extending projections defining a reduced area of said passages adjacent ends of said projections with portions of said projections tapering therefrom forming resilient gripping portions to engage conductors extending through the passages, said casing having an opening therein spaced from said flat surface, said outwardly extending projections on the body extending through and engaged in said casing opening to define a mounting point of the body, and flexible supporting flanges integral with said body and extending laterally therefrom adjacent the open end of the recess and secured relative to the casing to form spaced mounting points of the body to resiliently support said body relative to the casing.

8. In a lamp assembly, a casing having an open end, a lens mounted on said casing and closing the open end thereof, said casing having a flat surface therein spaced from the lens, a metallic bulb socket having an end wall in a plane perpendicular to the longitudinal axis of the socket, said end wall having an elongate opening therein, a shock resistant bulb socket mounting member of non-conducting resilient vibration dampening material, said mounting member comprising a body having a recess extending axially therein from an open end and terminating in a bottom, a flange on said body and extending radially inwardly in the recess in spaced relation to the bottom thereof, said bulb socket being positioned in said recess between and engaged with said bottom and flange, said flange defining a bulb base receiving opening of a size that said flange resiliently grips a bulb base positioned therein, means integral with said body and in said recess engaging said bulb socket to retain same against relative rotative movement, a terminal plate in said bulb socket and movable longitudinally thereof, resilient projections integral with said body and extending from the recessed bottom through the opening in the socket, said projections biasing said terminal plate toward the open end of the recess for engagement by a bulb base positioned in said socket, second projections on said body and extending outwardly therefrom in alignment with the first-named projections, said aligned projections having passages therein for conductors to the terminal plate, portions of the outwardly extending projections defining a reduced area of said passages adjacent ends of said projections with portions of said projections tapering therefrom forming resilient gripping portions to engage conductors extending through the passages, said casing having an opening therein spaced from said flat surface, said outwardly extending projections on the body extending through and engaged in said casing opening to define a mounting point of the body, flexible supporting flanges integral with said body and extending laterally therefrom adjacent the open end of the recess and having a surface engaging the flat surface of the casing, and means securing said supporting flanges to the casing to form spaced mounting points of the body to resiliently support said body relative to the casing.

9. In a lamp bulb mounting device, a metallic bulb socket having an end wall in a plane perpendicular to the longitudinal axis of the socket and adapted to receive a bulb base therein, a shock resistant bulb socket mounting member of non-conducting resilient vibration dampening material, said mounting member comprising a body having a recess extending axially therein from an open end and terminating in a bottom, a flange on said body and extending radially inwardly in the recess in spaced relation to the bottom thereof, said bulb socket being positioned in said recess between and engaged with said bottom and flange, said flange defining a bulb base receiving opening of a size that said flange resiliently grips a bulb base positioned therein, means integral with said body and in said recess engaging said bulb socket to retain same against relative rotative movement, a terminal plate in said bulb socket and movable longitudinally thereof, resilient projections integral with said body and extending from the recessed bottom through the opening in the socket, said projections biasing said terminal plate toward the open end of the recess for engagement by a bulb base positioned in said socket, second projections on said body and extending outwardly therefrom in alignment with the first-named projections, said aligned projections having passages therein for conductors to the terminal plate, portions of the outward extending projections defining a reduced area of said passages adjacent ends of said projections with portions of said projections tapering therefrom forming resilient gripping portions to engage conductors extending through the passages, and flexible supporting members integral with said body and extending laterally therefrom adjacent the open end of the recess and adapted to be secured to a support to form spaced mounting points to resiliently support said body relative to such support.

References Cited in the file of this patent
UNITED STATES PATENTS

| | | |
|---|---|---|
| 1,847,134 | Nikonow | Mar. 1, 1932 |
| 2,099,444 | Langdon | Nov. 16, 1937 |
| 2,202,315 | Langdon | May 28, 1940 |
| 2,413,381 | Rylsky | Dec. 31, 1946 |
| 2,640,910 | Talley | June 2, 1953 |
| 2,686,868 | Diedring | Aug. 17, 1954 |
| 2,712,120 | Cochran | June 28, 1955 |